US011016804B2

(12) United States Patent
Televitckiy et al.

(10) Patent No.: US 11,016,804 B2
(45) Date of Patent: May 25, 2021

(54) AHEAD OF TIME SCHEDULING PROCESS FOR AUTONOMOUS VEHICLES

(71) Applicant: Argo AI, LLC, Pittsburgh, PA (US)

(72) Inventors: Evgeny Televitckiy, Mountain View, CA (US); Guillaume Binet, Pittsburgh, PA (US)

(73) Assignee: Argo AI, LLC, Pittsburgh, PA (US)

(*) Notice: Subject to any disclaimer, the term of this patent is extended or adjusted under 35 U.S.C. 154(b) by 121 days.

(21) Appl. No.: 16/530,153

(22) Filed: Aug. 2, 2019

(65) Prior Publication Data

US 2021/0034412 A1    Feb. 4, 2021

(51) Int. Cl.
*G06F 9/48* (2006.01)
*G05D 1/00* (2006.01)

(52) U.S. Cl.
CPC ......... *G06F 9/4881* (2013.01); *G05D 1/0088* (2013.01); *G06F 9/485* (2013.01)

(58) Field of Classification Search
CPC .................................................. G06F 9/4881
See application file for complete search history.

(56) References Cited

U.S. PATENT DOCUMENTS

| 2010/0011079 | A1* | 1/2010 | Hitchcock | H04L 51/046 709/206 |
|---|---|---|---|---|
| 2018/0113857 | A1* | 4/2018 | Mora Lopez | G06F 9/5055 |
| 2019/0004516 | A1 | 1/2019 | Liu et al. | |
| 2019/0004528 | A1 | 1/2019 | Zhan et al. | |
| 2019/0004854 | A1 | 1/2019 | Yang et al. | |

OTHER PUBLICATIONS

The Node.js Event Loop, Timers, and process.nextTick( ), printed from the internet Jan. 12, 2019, https://nodejs.org/en/docs/guides/event-loop-timers-and-nexttick/.
Node.js-Event Loop, tutorials point, printed from the internet Jan. 12, 2019, https://www.tutorialspoint.com/nodejs/nodejs_event_loop.htm.
Scheduling Calls to Regular Functions-PyMOTW 3, printed from the internet Jan. 12, 2019, https://pymotw.com/3/asyncio/scheduling.html.

* cited by examiner

*Primary Examiner* — Charlie Sun
(74) *Attorney, Agent, or Firm* — Fox Rothschild LLP

(57) ABSTRACT

A method of scheduling a plurality of tasks in an autonomous vehicle system (AVS) includes, by a processor, prior to runtime of an autonomous vehicle, identifying a plurality of tasks to be implemented by the AVS of the autonomous vehicle, for each of the tasks, identifying at least one fixed parameter and at least one variable, and developing a schedule for each of the tasks. The schedule includes an event loop that minimizes an overall time for execution of the tasks. The method includes compiling the schedule into an execution plan, and saving the execution plan to a memory of the autonomous vehicle. During runtime of the autonomous vehicle, the processor receives data corresponding to the variables of the tasks, and uses the variables to implement the execution plan on the autonomous vehicle.

16 Claims, 4 Drawing Sheets

AHEAD OF TIME SCHEDULING PROCESS FOR AUTONOMOUS VEHICLES

BACKGROUND

The system architecture of autonomous vehicles typically includes several specialized hardware sub-systems such as vector processors, graphics processing units (GPUs), and/or tensor processing units (TPUs). These sub-systems often handle heavy or time consuming computational tasks such as neural net inferences, point cloud geometry calculations, path planning determinations and/or the like.

In general, these hardware sub-systems are targeted to support large cloud-based installations, with total throughput and scalability being their primary metric for success. However, in the context of autonomous vehicles, scalability is not a primary concern. Rather the primary metric for success is low latency. In addition, an autonomous vehicle must be able to execute several concurrent real time tasks that depend on the output of one another.

Current operating system schedulers tend to perform poorly as they overlook information needed to schedule tasks such as task dependencies, what computing unit a task requires and/or the like. As such, an autonomous vehicle scheduler that generates an execution plan prior to execution by an autonomous vehicle would be desirable.

SUMMARY

In an embodiment, a method of scheduling a plurality of tasks in an autonomous vehicle system (AVS) includes, by a processor, prior to runtime of an autonomous vehicle, identifying a plurality of tasks to be implemented by the AVS of the autonomous vehicle, for each of the tasks, identifying at least one fixed parameter and at least one variable, and developing a schedule for each of the tasks. The schedule includes an event loop that minimizes an overall time for execution of the tasks. The method includes compiling the schedule into an execution plan, and saving the execution plan to a memory of the autonomous vehicle. During runtime of the autonomous vehicle, the processor receives data corresponding to the variables of the tasks, and uses the variables to implement the execution plan on the autonomous vehicle.

Optionally, identifying at least one fixed parameter includes identifying one or more of the following: a task description, a rate of execution, one or more items of hardware that is required to execute the task, a maximum execution time associated with the task, or one or more task dependencies.

Developing the schedule may include analyzing data dependencies for a plurality of the tasks, identifying a second task having a function that is dependent on an output of a first task, and when developing the schedule, arranging the first task to occur before the second task in the schedule.

Optionally, developing the schedule may include assigning a maximum time to one or more of the tasks, and when implementing the execution plan, for any task whose execution time exceeds its assigned maximum time, performing one or more actions pertaining to the task and moving to a subsequent task in the schedule. Performing one or more actions pertaining to the task may include one or more of the following: skipping the task, suspending execution of the task, halting execution of the task, or terminating execution of the task.

The processor may include a subsystem of the autonomous vehicle.

Developing the schedule may include executing a Monte Carlo function to minimize a total processing time of the execution plan.

Receiving data corresponding to the variables of the tasks may include receiving data from one or more sensors of the autonomous vehicle.

In an embodiment, a system for scheduling a plurality of tasks in an autonomous vehicle system (AVS) includes a processor, and a computer-readable storage medium. The computer-readable storage medium includes one or more programming instructions that, when executed, causes the process to, prior to runtime of an autonomous vehicle, cause the processor to identify a plurality of tasks to be implemented by the AVS of the autonomous vehicle, for each of the tasks, identify at least one fixed parameter and at least one variable, and develop a schedule for each of the tasks. The schedule includes an event loop that minimizes an overall time for execution of the tasks. The system compiles the schedule into an execution plan, and saves the execution plan to a memory of the autonomous vehicle. The system also includes one or more programming instructions that, when executed, causes the processor to, during runtime of the autonomous vehicle receive data corresponding to the variables of the tasks, and use the variables to implement the execution plan on the autonomous vehicle.

Optionally, the system may identify at least one fixed parameter by identifying one or more of the following: a task description, a rate of execution, one or more items of hardware that is required to execute the task, a maximum execution time associated with the task, or one or more task dependencies.

The system may develop the schedule by analyzing data dependencies for a plurality of the tasks, identifying a second task having a function that is dependent on an output of a first task, and when developing the schedule, arranging the first task to occur before the second task in the schedule. The system may assign a maximum time to one or more of the tasks, and for any task whose execution time exceeds its assigned maximum time, perform one or more actions pertaining to the task and moving to a subsequent task in the schedule. The system may perform one or more of the following: skip the task, suspend execution of the task, halt execution of the task, or terminate execution of the task.

The processor may include a subsystem of the autonomous vehicle.

The system may develop the schedule by executing a Monte Carlo function to minimize a total processing time of the execution plan.

Receiving data corresponding to the variables of the tasks may include receiving data from one or more sensors of the autonomous vehicle.

DETAILED DESCRIPTION

Figure 1:
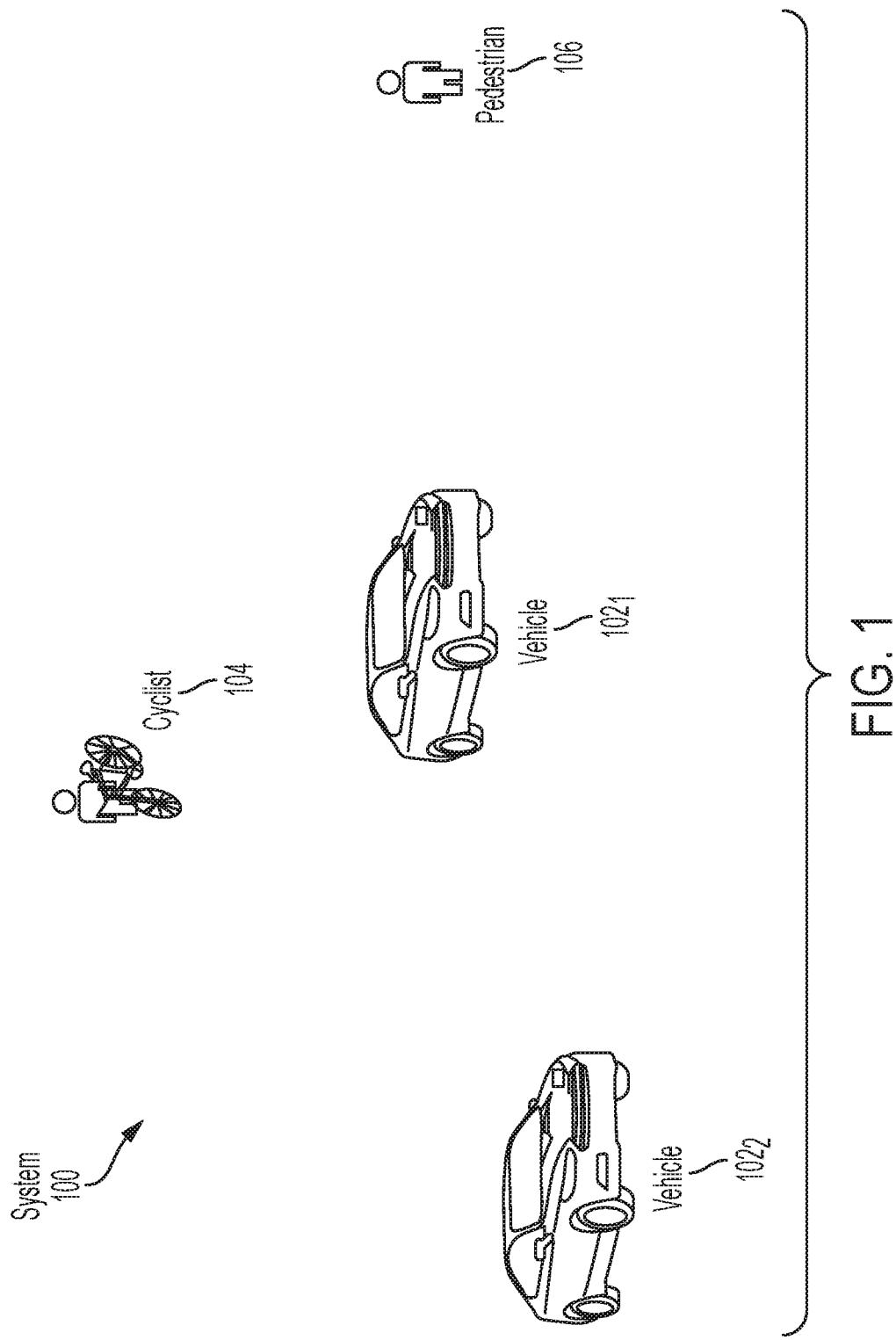
FIG. 1 illustrates an example autonomous vehicle.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

FIG. 1 illustrates an example system 100 that includes a vehicle 102 that is traveling along a road in a semi-autonomous or autonomous manner. Vehicle 102 is also referred to in this document as an Autonomous Vehicle ("AV"). The AV 102 can include, but is not limited to, a land vehicle (as shown in FIG. 1) such as an automobile, truck or van; an aircraft; or a watercraft.

Figure 2:
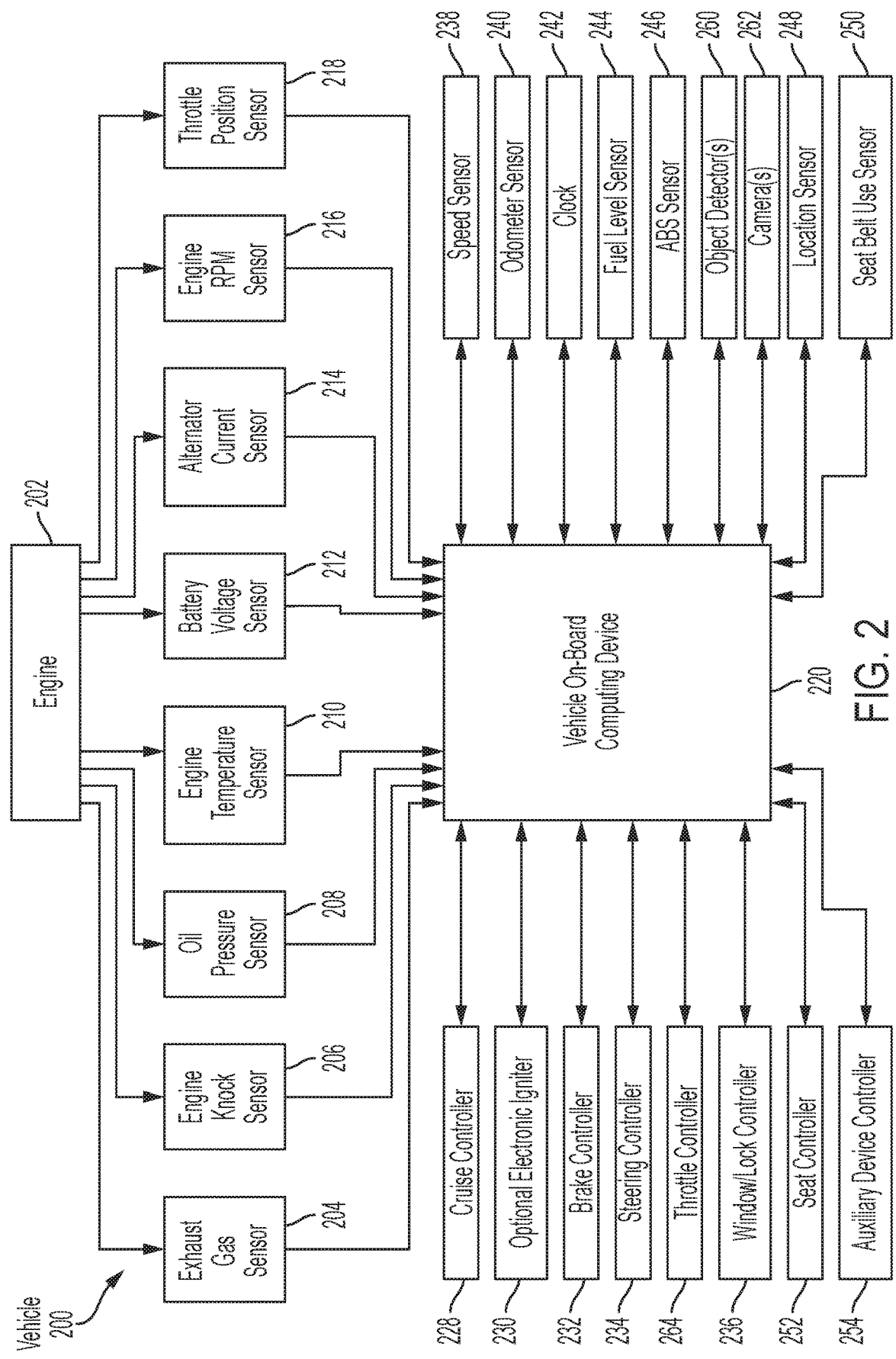
FIG. 2 illustrates an example system architecture for a vehicle.

FIG. 2 illustrates an example system architecture 200 for a vehicle. Vehicle 102 of FIG. 1 can have the same or similar system architecture as that shown in FIG. 2. Thus, the following discussion of system architecture 200 is sufficient for understanding vehicle such as 102 of FIG. 1.

Using the vehicle as an example, the vehicle's operating system, which may be referred to in this disclosure as an autonomous vehicle system, or AVS, may include one or more processing devices in communication with one or more data stores. An AVS may be in communication with one or more sensors of a vehicle. For example, an AVS may receive sensed data from a variety of sensors, as described below, as well as from other components of the vehicle.

Data also may be collected from operational components of the vehicle, such as the vehicle's battery, drivetrain, turn signal, accelerator, or any other vehicle component, in which such data may include commands delivered to the components, measured parameters (such as current, voltage, pressure, torque, etc.) or parameters used in operation (such as rotations per minute, current applied, etc.). Data also may be received from one or more processes operating on the vehicle, such as a process that uses data from multiple sensors to detect the presence of pedestrians or objects near the vehicle.

As shown in FIG. 2, the vehicle 200 includes an engine 202 and a plurality of sensors 204-218 measuring various parameters of the engine 202 or (in an electronic vehicle) motor. Still, it should be noted that the sensors, in some examples, may comprise an exhaust gas sensor 204, an engine knock sensor 206, an oil pressure sensor 208, an engine temperature sensor 210, a battery voltage sensor 212, an alternator current sensor 214, an engine rotations per minute (RPM) sensor 216, and a throttle position sensor 218. Other sensors 238, 240, 244-250, 260 also may be provided in the vehicle 200. These sensors may include a speed sensor 238, an odometer sensor 240, a fuel level sensor 244, an ABS sensor 246, a location sensor 248 (e.g., a global positioning system (GPS) device), a seat belt use sensor 250, and/or point cloud detectors 260. Vehicle 200 also comprises one or more cameras 262. The point cloud detectors 260 and/or cameras 262 allow an object to be detected within a given distance range of the vehicle 200 in any direction. In various embodiments, a point cloud detector 260 may comprise a Light Detection and Ranging (LiDAR) system, one or more cameras, one or more ultrasonic or other types of sensors, and/or the like.

During operations, information is communicated from the sensors 238, 240, 244-250, to one or more on-board computing devices 220. The on-board computing device 220 analyzes the engine parameter measurement data from the sensors 204-218, and optionally controls operations of the vehicle based on results of the analysis. For example, the on-board computing device 220 controls braking via a brake controller 232. The brake controller 232 can include a camera. Alternatively or additionally, the following features of the vehicle are controlled: engine speed via throttle controller 264; vehicle speed via throttle controller 264; gear of transmission; and/or vehicle steering via steering controller 234. The present solution is not limited in this regard. Other operations of the vehicle 200 can be controlled by the on-board computing device 220 via a cruise controller 228, an electronic ignitor 230, a window/lock controller 236, and/or a seat controller. Auxiliary devices of the vehicle can be controlled via the auxiliary device controller 254. The auxiliary devices include, but are not limited to, a radio, a display, a near-field or short-range (e.g., Bluetooth™) enabled device (e.g., a mobile phone or SRC-System™) or any other device (e.g., a speed radar) communicatively coupled to the on-board computing device 220.

Object detection information is communicated from object detector(s) 260 to the on-board computing device 220. Additionally, captured images are communicated from the camera(s) 262 to the on-board computing device 220. The object detection information and/or captured images are processed by the on-board computing device 220 to detect objects in proximity to the vehicle 200. Techniques for making an object detection based on sensor data and/or captured images are well known in the art. Any known or to be known technique for making an object detection based on sensor data and/or captured images can be used herein.

When such an object detection is made, the on-board computing device 220 performs operations to: generate one or more possible object trajectories for the detected object; and analyze at least one of the generated possible object trajectories to determine if there is a risk of a collision in a threshold period of time (e.g., 1 minute). If so, the on-board computing device 220 performs operations to determine whether the collision can be avoided if a given vehicle trajectory is followed by the vehicle 200 and any one of a plurality of dynamically generated emergency maneuvers is performed in a pre-defined time period (e.g., N milliseconds). If the collision can be avoided, then the on-board computing device 220 takes no action to change the vehicle trajectory or optionally causes the vehicle 200 to perform a cautious maneuver (e.g., mildly slows down). In contrast, if the collision cannot be avoided, then the on-board computing device 220 causes the vehicle 200 to immediately take an emergency maneuver (e.g., brakes and/or changes direction of travel).

Figure 3:
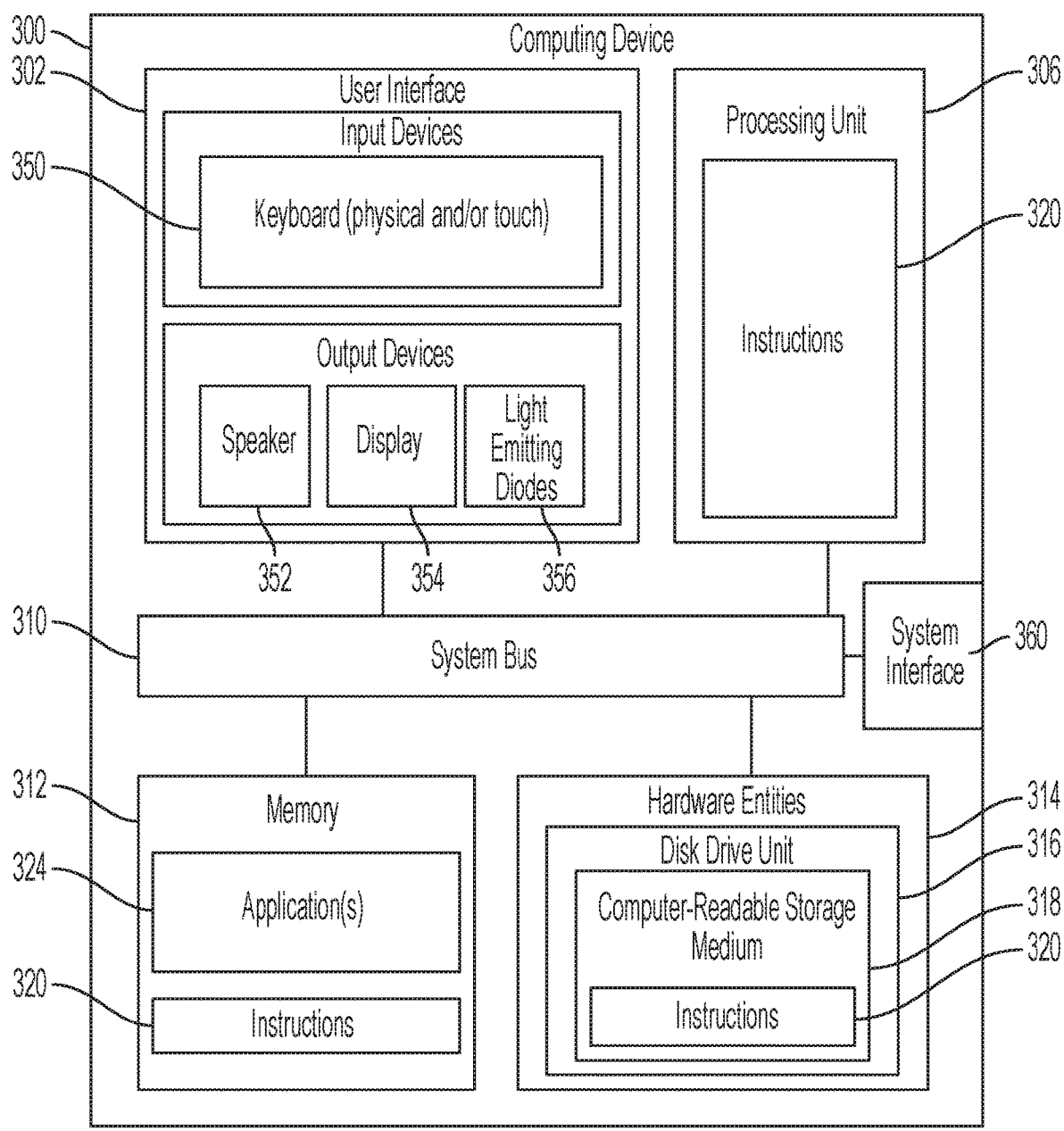
FIG. 3 illustrates various components of an example computing device.

Referring now to FIG. 3, there is provided an illustration of an illustrative architecture for a computing device 300. The vehicle on-board computing device 220 of FIG. 2 is the same as or similar to computing device 300. As such, the discussion of computing device 300 is sufficient for understanding the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a processing unit 306 such as, for example, a central processing unit (CPU), a graphics processing unit (GPU), and/or a tensor processing unit (TPU), a system bus 310, a memory 312 connected to and accessible by other portions of computing device 300 through system bus 310, a system interface 360, and hardware entities 314 connected to system bus 310. In various embodiments, a computing device 300 may have a user interface 302, which may include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory ("RAM"), a disk drive, flash memory, and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
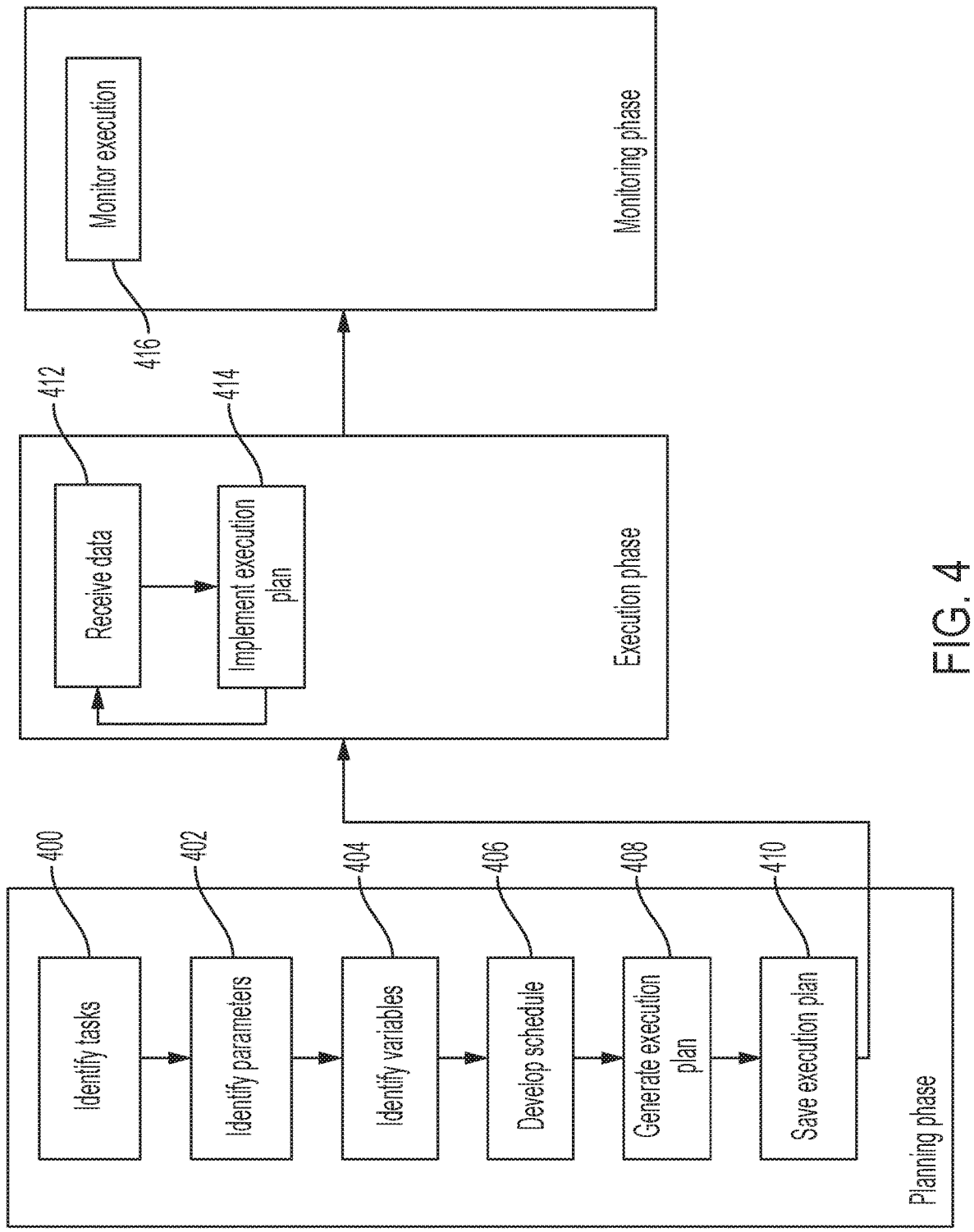
FIG. 4 illustrates an example method of scheduling tasks in an autonomous vehicle system.

FIG. 4 illustrates a method of scheduling tasks in an AV system according to an embodiment. The method illustrated in FIG. 4 may be performed by one or more processors of an AV system prior to runtime of an AV.

As illustrated by FIG. 4, scheduling tasks in an AV system may include a planning phase, an execution phase and/or a monitoring phase. The execution phase may occur a multiple number of times for one or more planning phases. One planning phase may generate multiple execution plans. In various embodiments, an execution plan may be selected.

As shown in FIG. 4, an AV system may identify 400 a plurality of tasks to be implemented by an AV. A task refers to a function or operation that may be performed by an AV, or a system or sub-system of an AV. For example, a task may be a system or function call executed by an AV system. The system or function call may be performed as part of, without limitation, obtaining a frame from one or more cameras, detecting and/or processing traffic signs or signals, performing lane detecting, steering, obtaining location information from one or more sensors, setting speed parameters and/or the like.

In various embodiments, certain tasks may be performed in parallel. In some embodiments, certain tasks may take precedence over other tasks or may have a higher critical level than other tasks. A task may receive one or more inputs and provide one or more outputs. One or more inputs to a task may be an output of another task. In other words, tasks may be dependent on one or more other tasks, and some tasks may not be able to start until one or more other tasks have ended.

A task may be associated with a release time, an execution time and/or a complete time. A release time refers to a time when a task is released or otherwise begins. An execution time refers to the amount of time that a task takes to execute. And a complete time refers to a time when a task is finished executing.

In various embodiments, a plurality of tasks may be identified 400 based on historical information associated with the AV or other AVs. For instance, tasks may be identified 400 based on one or more tasks previously executed by one or more AVs, such as, for example, AVs in a fleet. In other embodiments, tasks may be identified 400 from a task plan associated with an AV. For instance, a task plan may be developed for operation of an AV that includes one or more tasks to be performed to achieve that operation.

Referring back to FIG. 4, an AV system may identify 402 one or more parameters associated with one or more tasks. A parameter refers to a static or fixed value that contributes to the operation of a task. Example parameters may include, for example, a task description, a rate of execution, hardware that is required to execute the task, a maximum execution time associated with the task, and/or one or more dependencies.

An AV system may identify 404 one or more variables associated with one or more tasks. A variable refers to a dynamic value that contributes to the operation of a task. Example variables may include, without limitation, execution time of previous workload, currently workload intensity, future predicted latency and/or the like.

An AV system may develop 406 a schedule that includes one or more of the identified tasks. The tasks may be included in a particular order or sequence within the schedule. In other words, a schedule may define a particular order of execution of tasks. This order may be based, at least in part, on one or more dependencies of a task. An AV system may analyze data dependencies of one or more tasks in order to develop the schedule. For instance, if Task B depends on the output (and therefore) completion of Task A, then Task B will be included in the schedule after Task A so that Task A will occur before Task B occurs.

In various embodiments, developing 406 a schedule may involve assigning a maximum execution time to one or more of the tasks. A maximum execution time refers to an amount of time within which the task must be completed. A maximum execution time may be assigned by a system operator or administrator. Alternatively, a maximum execution time may be automatically assigned by the system based on one or more criteria such as the type of task.

A task that has not completed within its maximum execution time may signal to the AV system that something is amiss in the execution, in which case the AV system may take one or more actions, as described in more detail below.

In various embodiments, developing 406 a schedule may include generating an event loop of tasks that minimizes an overall time for execution of the tasks. The event loop may be determined using one or more simulation or sampling techniques. For instance, an AV system may use one or more algorithms that rely on random sampling to determine a sequence of tasks that minimizes an overall execution time of the event loop while preserving any requirements pertaining to order, criticality and/or dependency of the tasks of the event loop. An example of such a simulation or sampling techniques are Monte Carlo methods. Additional and/or alternate techniques may be used within the scope of this disclosure.

Once a schedule is developed, an execution plan for an AV may be generated 408. In an embodiment, an execution plant for an AV may be generated 408 by compiling the schedule. The AV system may save 410 the execution plan to a data store or memory of an AV or cause the execution plan to be saved in memory of an AV.

During runtime of the AV, the AV system may receive 412 data that correspond to one or more variables associated with one or more tasks of the execution plan. The received data may be received 412 from one or more sensors of the AV, one or more electronic devices located remotely from the AVS and/or one or more other sources.

Using the received data, the AV system may implement 414 the execution plan on the vehicle. For instance, the AV system may provide the received data to the AV so that it can use the data to cause one or more of the tasks defined in the execution plan to be executed.

In various embodiments, an execution plan may be executed several times. As such, the steps of receiving 412 data and implementing 414 the execution plan may be repeated one or more times as illustrated in FIG. 4.

In this regard, the AV system generates an execution plan for an AV ahead of time—specifically, before the AV performs one or more of the tasks defined by the execution plan. At execution time, the only information needed to implement the execution plan are variable values which the AV system feeds to the AV as it receives such information. In this way, the processing time associated with implementing the execution plan is greatly reduced.

In various embodiments, the AV system may monitor 416 execution of the execution plan to detect whether one or more issues arise. For example, the AV system may monitor the execution time of one or more tasks to determine whether the execution time exceeds a corresponding assigned maximum time. If the execution time of a task exceeds a corresponding assigned maximum time associated with the task, then the AV system may take one or more actions. For example, the AV system may ignore or skip the task and execute a subsequent task in the schedule. As another example, the AV system may suspend, halt or terminate a task's execution, and execute a subsequent task in the schedule.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of scheduling a plurality of tasks in an autonomous vehicle system (AVS), the method comprising:
   by a processor, prior to runtime of an autonomous vehicle:
      identifying a plurality of tasks to be implemented by the AVS of the autonomous vehicle,
      for each of the tasks, identifying at least one fixed parameter and at least one variable,
      developing a schedule for each of the tasks, wherein the schedule comprises an event loop that minimizes an overall time for execution of the tasks,
      compiling the schedule into an execution plan, and
      saving the execution plan to a memory of the autonomous vehicle; and
   by the processor during runtime of the autonomous vehicle:
      receiving data corresponding to the variables of the tasks, and
      using the variables to implement the execution plan on the autonomous vehicle.

2. The method of claim 1, wherein identifying at least one fixed parameter comprises identifying one or more of the following:
- a task description;
- a rate of execution;
- one or more items of hardware that is required to execute the task;
- a maximum execution time associated with the task; or
- one or more task dependencies.

3. The method of claim 1, wherein developing the schedule comprises:
- analyzing data dependencies for a plurality of the tasks;
- identifying a second task having a function that is dependent on an output of a first task; and
- when developing the schedule, arranging the first task to occur before the second task in the schedule.

4. The method of claim 1, wherein:
- developing the schedule comprises assigning a maximum time to one or more of the tasks; and
- when implementing the execution plan, for any task whose execution time exceeds its assigned maximum time, performing one or more actions pertaining to the task and moving to a subsequent task in the schedule.

5. The method of claim 4, wherein performing one or more actions pertaining to the task comprises one or more of the following:
- skipping the task;
- suspending execution of the task;
- halting execution of the task; or
- terminating execution of the task.

6. The method of claim 1, wherein the processor comprises a subsystem of the autonomous vehicle.

7. The method of claim 1, wherein developing the schedule comprises executing a Monte Carlo function to minimize a total processing time of the execution plan.

8. The method of claim 1, wherein receiving data corresponding to the variables of the tasks comprises receiving data from one or more sensors of the autonomous vehicle.

9. A system for scheduling a plurality of tasks in an autonomous vehicle system (AVS), the system comprising:
- a processor; and
- a computer-readable storage medium comprising:
  - one or more programming instructions that, when executed, causes the processor to, prior to runtime of an autonomous vehicle:
    - identify a plurality of tasks to be implemented by the AVS of the autonomous vehicle,
    - for each of the tasks, identify at least one fixed parameter and at least one variable,
    - develop a schedule for each of the tasks, wherein the schedule comprises an event loop that minimizes an overall time for execution of the tasks,
    - compile the schedule into an execution plan, and
    - save the execution plan to a memory of the autonomous vehicle; and
  - one or more programming instructions that, when executed, causes the processor to, during runtime of the autonomous vehicle:
    - receive data corresponding to the variables of the tasks, and
    - use the variables to implement the execution plan on the autonomous vehicle.

10. The system of claim 9, wherein the one or more programming instructions that, when executed, cause the processor to identify at least one fixed parameter comprise one or more programming instructions that, when executed, cause the processor to identify one or more of the following:
- a task description;
- a rate of execution;
- one or more items of hardware that is required to execute the task;
- a maximum execution time associated with the task; or
- one or more task dependencies.

11. The system of claim 9, wherein the one or more programming instructions that, when executed, cause the processor to develop the schedule comprise one or more programming instructions that, when executed, cause the processor to:
- analyze data dependencies for a plurality of the tasks;
- identify a second task having a function that is dependent on an output of a first task; and
- when developing the schedule, arrange the first task to occur before the second task in the schedule.

12. The system of claim 9, wherein:
- the one or more programming instructions that, when executed, cause the processor to develop the schedule comprise one or more programming instructions that, when executed, cause the processor to assign a maximum time to one or more of the tasks; and
- the one or more programming instructions that, when executed, cause the processor to implement the execution plan comprise one or more programming instructions that, when executed, cause the processor to, for any task whose execution time exceeds its assigned maximum time, perform one or more actions pertaining to the task and moving to a subsequent task in the schedule.

13. The system of claim 12, wherein the one or more programming instructions that, when executed, cause the processor to perform one or more actions pertaining to the task comprise one or more programming instructions that, when executed, cause the processor to perform one or more of the following:
- skip the task;
- suspend execution of the task;
- halt execution of the task; or
- terminate execution of the task.

14. The system of claim 9, wherein the processor comprises a subsystem of the autonomous vehicle.

15. The system of claim 9, wherein the one or more programming instructions that, when executed, cause the processor to develop the schedule comprise one or more programming instructions that, when executed, cause the processor to execute a Monte Carlo function to minimize a total processing time of the execution plan.

16. The system of claim 9, wherein the one or more programming instructions that, when executed, cause the processor to receive data corresponding to the variables of the tasks comprise one or more programming instructions that, when executed, cause the processor to receive data from one or more sensors of the autonomous vehicle.

* * * * *